Figure 1:
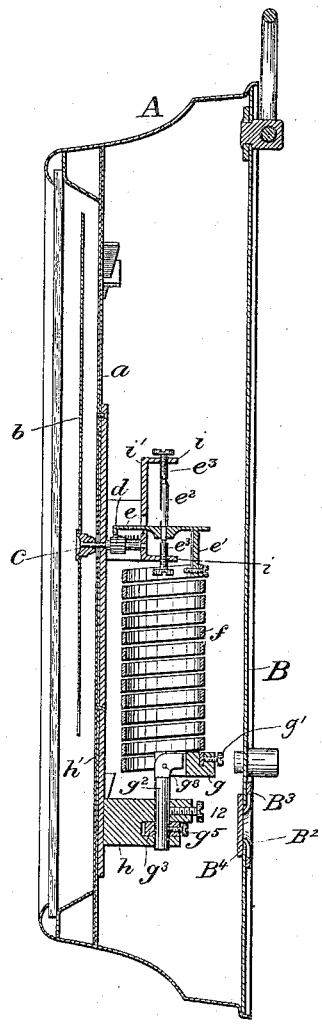

(No Model.)

T. W. SHEPHERD.
THERMOMETER.

No. 330,161. Patented Nov. 10, 1885.

Witnesses.
John F. Nelson
John F. C. Prinkert

Inventor.
Thomas W. Shepherd
by Crosby & Gregory
attys

UNITED STATES PATENT OFFICE.

THOMAS W. SHEPHERD, OF PEABODY, MASSACHUSETTS, ASSIGNOR TO EDGAR W. UPTON, OF SAME PLACE.

THERMOMETER.

SPECIFICATION forming part of Letters Patent No. 330,161, dated November 10, 1885.

Application filed May 4, 1885. Serial No. 164,294. (No model.)

*To all whom it may concern:*

Be it known that I, THOMAS W. SHEPHERD, of Peabody, county of Essex, and State of Massachusetts, have invented an Improvement in Thermometers, of which the following description, in connection with the accompanying drawings, is a specification, like letters on the drawings representing like parts.

This invention relates to thermometers of that class in which the pointer is moved by the expansion or contraction of a solid material, usually a lamina or strip composed of two metals of unequal expansibility, which twist or become distorted under change of temperature.

The main object of this invention is to simplify and cheapen the construction of thermometers, and thus enable those of the class referred to to be made of superior quality, and at much less expense than those heretofore produced.

In the invention herein to be described the sensitive portion of the thermometer, or that which actuates the pointer when the temperature changes, consists of a helical coil composed of two strips of material, usually iron or steel and brass, which have different rates of expansion, thus causing the coil to curl or twist around as the temperature varies, one end of the sensitive helical coil being made fast, while the other end is connected through suitable mechanism with the pointer. A sensitive helical coil is well known in the arts, and hence is not herein claimed, broadly.

The invention consists in a holding device substantially as herein described for the fixed end of the helical coil, whereby the position of the point of attachment of one end of said coil with the holding device may be varied, or whereby the effective length of the said coil may be adjusted, so that the sensitive helical coils of a number of instruments may be made to produce the same amount of movement of the pointer under like change in temperature, although the said helical coils are themselves not exactly uniform, owing to difference in size. This adjustment enables the dials, pointers, and other parts of the mechanism to be readily set to operate uniformly under like conditions, thus enabling the production of helical coils in quantity, and insuring a high quality of work at a comparatively moderate expense.

The invention also consists in an adjusting device for varying the position of the helical coil with relation to other parts of the mechanism, so that the pointer may readily be set at the proper graduation on the dial for a given temperature.

In accordance with one part of my invention the clamping-arm for the fixed end of the sensitive helical coil is pivoted upon the arbor which supports it, whereby sudden jar or shock to the thermometer is neutralized, so as not to affect the position of the hands, as will be described.

Figure 2:
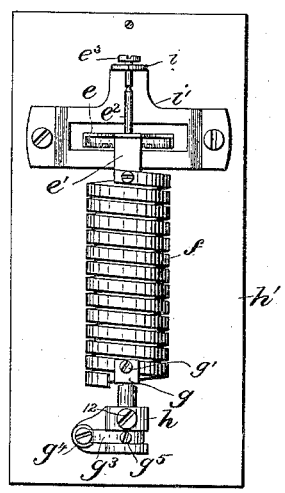
Figure 4:
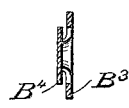
Figure 5:
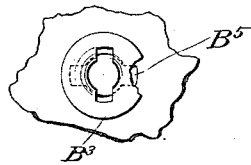
Figure 6:
Figure 3:
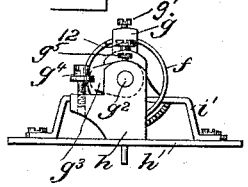

Figure 1 is a vertical central section of a thermometer embodying my present invention; Fig. 2, a rear elevation of the sensitive helical coil and its supporting-frame detached; Fig. 3, an end elevation of Fig. 2; Figs. 4 and 5, details of the rear side of the case to be described, and Fig. 6 two different views of the adjusting device for the fixed end of the sensitive helical coil.

The dial $a$, pointer, $b$, arbor $c$, provided with pinion $d$, toothed segment $e$, having an arm, $e'$, connected with what is to be the movable end of the sensitive helical coil $f$, and the plate or frame-work $h'$ and its lug or bracket $h$ are all substantially as in United States application, Serial No. 138,167, filed July 19, 1884, Edgar W. Upton inventor, and hence not claimed by me.

The ends of the arbor $e^2$ of the segment are pointed to form pivots, and the steps or bearings for said pivots are both adjustable in the direction of the axis of the arbor, the said steps in this instance being made as screws $e^3$, supported in projections $i$ of a bridge, $i'$, connected with the plate $h'$, the said bridge also constituting a bearing for one end of the pinion-arbor $c$. By making the steps $e^3$ adjustable, as described, the toothed segment $e$ may be readily set to mesh properly with the pinion $d$, a matter which would otherwise be difficult to accomplish.

In the application above referred to, the end of the sensitive helical coil, which is to be held in fixed position, is held by a screw or clamping device in an arm forming part of an attaching device, the parts referred to enabling the end of the coil most remote from the segment and arbor $c$ to be made fast at any desired distance from its end in order to bring its effective portion between the said arm and the point of attachment of the coil with the toothed segment adjustment of the end of the coil in the attaching device, enabling the coil and the mechanism between it and the pointer to operate the same with relation to the dial all alike, thus securing accuracy in adjustment and uniformity of operation under like circumstances of all the thermometers.

In order to set the pointer at the proper position on the dial after the adjustment of the helical coil has been made, the shaft $g^2$, with which is connected the arm $g$, (the arm being pivoted thereto at $g^8$ for a purpose to be described,) is extended through a hole in the lug or bracket $h$ of the plate $h'$, and is provided with an arm, $g^3$, herein shown as slotted at its end to be engaged by the adjusting-screw $g^4$, screwed into, as herein shown, the bracket $h$, adjustment of the said screw enabling a slow minute adjustment bodily of the helical coil to be made without changing the relative positions of its attaching-points, and thus, through the gear and pinion, moves the pointer $b$ until it is in exactly the right position.

In practice, when adjusting the thermometer for use, the arm $g^3$ will be left loose on the shaft $g^2$, and the latter will be turned to bring the pointer nearly in correct position, when the said shaft will be held by the set-screw 12, and then the arm $g^3$ will be secured to the said shaft by the set-screw $g^5$, and the final adjustment of the shaft, (the screw 12 being loosened,) will be completed by the adjusting-screw $g^4$.

In order to relieve the sensitive helical coil composed of a bi-metallic strip from lengthwise strain between its points of attachment, the arm $g$ is connected with the arbor $g^2$ by a joint, $g^8$, which permits said arm to rock slightly on the arbor $g^2$ to accommodate any movement of the end of the coil connected with the said arm in a direction parallel with the axis of the said coil, without, however, permitting the said end of the coil engaged by the clamping device $g'$ to have any movement around its axis, the said clamping device being adapted to hold the said coil at any desired point near the other end.

The entire instrument is inclosed in a case composed of a ring, A, (see Fig. 1,) forming a frame over the dial, which is preferably covered with glass, and a back plate, B, provided with an opening opposite the adjusting-screw $g^4$, the said opening having a removable cap, B³, provided with projections B⁴, (see Figs. 1 and 4,) which pass through notches B⁵ in the plate, and by a partial turn engaging said plate, fastening the cap or cover in position to close the opening B², as shown in Fig. 5. Thus, by removing the cap B³, a screw-driver may be inserted, and the screw $g^4$ turned to adjust the position of the pointer after the instrument is put together and inclosed in the case.

I do not claim the means shown of supporting the axis of the segment upon adjustable screws as bearings.

I claim—

1. The pointer and sensitive helical coil and connecting mechanism between the said pointer and one end of the said coil, in combination with a clamping screw or device, $g'$, and arm $g$, adapted to hold the said coil at any desired point near its other end, a shaft, $g^2$, to which the said arm is attached, and with means, substantially as described, for adjusting the position of the said shaft and its attached clamping device about the axis of the coil, substantially as described.

2. The frame or plate $h'$, having the lug or projection $h$, the helical coil, the segment provided with the arm $e'$, and the support for the segment, combined with the arbor $g^2$, and with the arm $g$, pivoted thereon, and with screws to hold each end of the coil, to operate substantially as described.

3. A thermometer comprising a pointer and sensitive helical coil and connecting mechanism between the said pointer and one end of the said coil, and a holding and adjusting device for the other end of the said coil, consisting of an arbor and arm connected therewith and an adjusting-screw co-operating with the said arm, and a second arm connected with the said arbor and provided with a clamping device to engage the sensitive helical coil at the proper point near its end, and an inclosing-case for said parts provided with a removable cap, affording access to the adjusting-screw, substantially as described.

4. In a thermometer, the arbor and its attached pivoted clamping-arm and the clamping device, combined with and holding the fixed end of the sensitive helical coil, substantially as described.

5. In a thermometer, the arbor $g^2$, the arm $g^3$, and adjusting-screw to move it, and the clamping-arm pivoted upon the said arbor, and the clamping device, in combination with and holding the fixed end of the sensitive helical coil, substantially as described.

In testimony whereof I have signed my name to this specification in the presence of two subscribing witnesses.

THOMAS W. SHEPHERD.

Witnesses:
EDGAR W. UPTON,
CHAS. E. HOAG.